Patented Oct. 5, 1926.

1,602,183

UNITED STATES PATENT OFFICE.

EDGAR G. THOMSSEN, OF WINONA, MINNESOTA, ASSIGNOR TO THE J. R. WATKINS COMPANY, OF WINONA, MINNESOTA, A CORPORATION OF DELAWARE.

PRODUCT FOR DISSOLVING ESSENTIAL OILS.

No Drawing. Application filed July 24, 1925. Serial No. 45,956.

My invention relates to solvents for organic compounds and refers particularly to solvents for those compounds known as essential oils, flavoring oils, organic flavoring synthetics, gums and resins and especially those which are useful for, and applicable to, the production of flavoring compounds for food products.

Alcohol is the generally employed solvent for the above mentioned organic compounds, but because of the present legal restrictions surrounding the use of alcohol, it is highly desirable that some solvent other than alcohol be employed for this purpose.

In order that a solvent be suitable for this purpose, it must dissolve the compounds, be miscible in water, have preservative properties and must be devoid of foreign flavors or odors.

The solvents of my invention possess all of the above, and other, desirable properties and attributes and some of them possess in addition valuable nutritive properties.

I have found that the esters produced from hydroxy acids possess high solvent actions upon the flavoring organic compounds and that some of these, because of their tasteless and odorless properties, are particularly suitable for this purpose.

I have found that ethyl lactate is particularly suitable as a solvent for flavoring organic compounds, although I do not limit myself to this particular ester of the hydroxy acids.

As examples of the use of ethyl lactate for the described purpose, I give the following:—

To produce lemon extract, I mix 400 parts ethyl lactate with 100 parts water and 2.5 parts alcohol. 27.5 parts oil of lemon are then dissolved in this menstruum, preferably by agitation. The mixture is filtered if necessary.

To produce vanilla extract, 12.5 parts chopped vanilla beans are macerated for two weeks in a menstruum consisting of 65 parts ethyl lactate and 35 parts water, after which there are added to the mixture 162.5 parts ethyl lactate, 87.5 parts water and 60 parts sugar.

To make vanilla and coumarin compound flavor, I dissolve 2 parts vanillin and .5 parts coumarin in a menstruum of 330 parts ethyl lactate, 180 parts water, 120 parts sugar and .5% alcohol by volume.

The oil of lemon mentioned above may be replaced by the proper quantities of such flavoring oils as orange, almond, peppermint, cinnamon, etc.

The addition of alcohol is not essential but I prefer to use it, as it increases the preservative properties and the familiar alcoholic odor.

Among the flavoring organic compounds to which my new solvent is particularly adaptable, in addition to those mentioned, are amyl acetate, amyl butyrate, butyric ether, sebacic ether and valeric ether, but I do not limit the application of my solvent to these mentioned flavoring organic compounds.

By hydroxy-acid-ester soluble organic compounds in my specification and claims, I mean those organic compounds which are soluble in an ester of a hydroxy acid.

I do not limit myself to the particular chemicals, quantities, times or steps of procedure specifically mentioned, as these are given simply as a means for clearly describing my invention.

What I claim is:—

1. A flavoring extract consisting of a flavoring material dissolved in an ester of hydroxy acid.

2. A flavoring extract consisting of a flavoring material dissolved in ethyl lactate.

3. A flavoring extract consisting of a flavoring material dissolved in an ester of a hydroxy acid and containing an alcohol.

4. A flavoring extract consisting of a flavoring material dissolved in ethyl lactate and containing an alcohol.

Signed at Winona in the county of Winona and State of Minnesota this 21st day of July, 1925.

EDGAR G. THOMSSEN.